United States Patent
Atkinson

(10) Patent No.: US 6,968,738 B2
(45) Date of Patent: Nov. 29, 2005

(54) ACOUSTIC FLUID-GAUGING SYSTEM

(75) Inventor: Harry Atkinson, Berkshire (GB)

(73) Assignee: Smiths Group plc, (GB)

( * ) Notice: Subject to any disclaimer, the term of this patent is extended or adjusted under 35 U.S.C. 154(b) by 0 days.

(21) Appl. No.: 10/255,717

(22) Filed: Sep. 27, 2002

(65) Prior Publication Data
US 2003/0061876 A1 Apr. 3, 2003

(30) Foreign Application Priority Data
Oct. 2, 2001 (GB) .................................. 0123598

(51) Int. Cl.⁷ .......................................... G01F 23/296
(52) U.S. Cl. .................................................. 73/290 V
(58) Field of Search .......................... 73/290 R, 290 V; 367/99

(56) References Cited

U.S. PATENT DOCUMENTS

| | | | |
|---|---|---|---|
| 4,785,664 A * | 11/1988 | Reebs ....................... | 73/290 V |
| 4,815,323 A * | 3/1989 | Ellinger et al. ............ | 73/290 V |
| 4,992,998 A * | 2/1991 | Woodward .................... | 367/99 |
| 5,062,295 A | 11/1991 | Shakkottai et al. | |
| 5,319,972 A * | 6/1994 | Oblak et al. ............... | 73/290 R |
| 5,748,471 A | 5/1998 | Grande | |
| 5,856,953 A * | 1/1999 | Durkee ......................... | 367/99 |
| 5,877,997 A * | 3/1999 | Fell .............................. | 367/99 |
| 5,996,407 A * | 12/1999 | Hewitt ....................... | 73/290 V |
| 6,157,894 A * | 12/2000 | Hess et al. ................. | 73/290 R |
| 6,345,683 B1 * | 2/2002 | Gordon et al. .............. | 181/124 |

FOREIGN PATENT DOCUMENTS

| | | |
|---|---|---|
| GB | 2309524 A | 7/1997 |
| JP | 8-219854 | 8/1996 |
| JP | 11-218436 | 8/1999 |
| WO | WO-96/24027 | 8/1996 |

OTHER PUBLICATIONS

Search Report.

* cited by examiner

Primary Examiner—Daniel S. Larkin
Assistant Examiner—Rodney Frank
(74) Attorney, Agent, or Firm—Connolly, Bove, Lodge & Hutz LLP

(57) ABSTRACT

An aircraft ultrasonic fuel-gauging system has a processing unit that energizes probes and receives signals from transducers arising from energy reflected back from the fuel surface. In addition to determining the time between transmission of a signal from the transducer and reception of its reflection from the fuel surface, the processing unit also determines the time of reception of subsequent reflections caused by reflection back from the lower end of the probe. The processing unit determines whether the subsequent reflected signals are within predetermined limits of the time interval between transmission and reception of the first reflected signal in order to confirm the validity of the first signal. The processing unit also counts the number of subsequent reflected signals received within predetermined time intervals to assign a confidence level and this used to select between different incompatible signals, such as signals from that probe at different times or signals from different probes.

21 Claims, 1 Drawing Sheet

ACOUSTIC FLUID-GAUGING SYSTEM

BACKGROUND OF THE INVENTION

This invention relates to acoustic fluid-gauging systems and methods.

The invention is more particularly, but not exclusively concerned with ultrasonic fuel gauging systems for aircraft.

Fuel quantity in an aircraft fuel tank can be measured by means of ultrasonic probes. These consist of an ultrasonic transducer mounted at the lower end of a tube or stillwell. The probe is immersed in any fuel present so that fuel fills the stillwell to the same height as in the tank. A voltage applied to the transducer generates a burst of ultrasonic energy, which is transmitted upwardly through the fuel. When the signal meets the fuel surface, that is, its interface with the air above the fuel, a part of the energy is reflected back to the transducer. Energy received by the transducer produces a voltage; this is supplied to a suitable processor to measure the time between transmission and reception. The height of fuel above the transducer can then be calculated from the known speed of the ultrasonic pulse in the fuel. The volume of fuel in the tank is calculated from the outputs of several probes and with knowledge of the shape of the tank.

There are various problems with ultrasonic gauging systems. In particular, it can be difficult to distinguish between the signal produced by the true reflection off the fuel surface and noise signals, such as reflections from the surface of the probe. This problem can be made worse if the fuel surface is at an angle, if it is disturbed by waves or foam, is rapidly moving or is otherwise perturbed.

BRIEF SUMMARY OF THE INVENTION

It is an object of the present invention to provide an alternative acoustic gauging system and method.

According to one aspect of the present invention there is provided an acoustic fluidgauging system including an acoustic transducer arranged to transmit acoustic signals to a fluid interface and to receive acoustic signals reflected from the interface, the system being arranged to measure the time between transmission of a signal and reception of a reflected signal, to monitor for a subsequent signal arising from reflection of the reflected signal back to the fluid interface, and to utilise information derived from a subsequent signal in determining fluid quantity.

The system is preferably arranged to determine whether the time interval between reception of the first reflected signal and the subsequent reflected signal is within predetermined limits of the time interval between transmission and reception of the first reflected signal. The system may be arranged to determine the number of such subsequent reflected signals detected within predetermined time limits. The transducer may be a part of a probe including a still well, the transducer being mounted at the lower end of the still well. The lower end of the probe is preferably arranged to reflect acoustic energy upwardly. The system may include a plurality of transducers. The system may be arranged to assign a level of confidence to a received signal, the level of confidence being greater the greater the number of reflections associated with that signal, and the system may be arranged to select between different incompatible signals according to the confidence level of each signal. The incompatible signals may be signals from the same transducer at different times or signals from different transducers. The system may be arranged to determine the ratios of the times of arrival of successive reflections and to use information about the ratios to identify the number of a reflection.

According to a second aspect of the present invention there is provided a method of gauging fluid including the steps of transmitting an acoustic signal from a first location to a fluid interface, receiving a signal reflected back from the interface, determining a first time interval between transmission and reception of the reflected signal, receiving a subsequent reflected signal arising from reflection of the reflected signal back to the fluid interface, and utilising information derived from a subsequent signal in determining fluid quantity.

The method may include the steps of determining the time interval between reception of the first reflected signal and the subsequent reflected signal and determining whether the time interval of the subsequent reflected signal is within predetermined limits of the first time interval. The method may include the step of determining the number of such subsequent reflected signals detected within predetermined time limits. The method may include the step of assigning a level of confidence to a signal, the level of confidence being greater the greater the number of reflections associated with that signal. The method may include the step of selecting between different incompatible signals according to the confidence level of each signal. The incompatible signals may be signals from the same transducer at different times or they may be signals from different transducers. The method may include the steps of determining the ratios of times of arrival of successive reflections and using information about the ratios to identify the number of a reflection.

According to a third aspect of the present invention there is provided a system for carrying out a method according to the above second aspect of the invention.

An aircraft fuel-gauging system and method according to the present invention will now be described, by way of example, with reference to the accompanying drawings.

DETAILED DESCRIPTION OF THE PREFERRED EMBODIMENT

Figure 1:
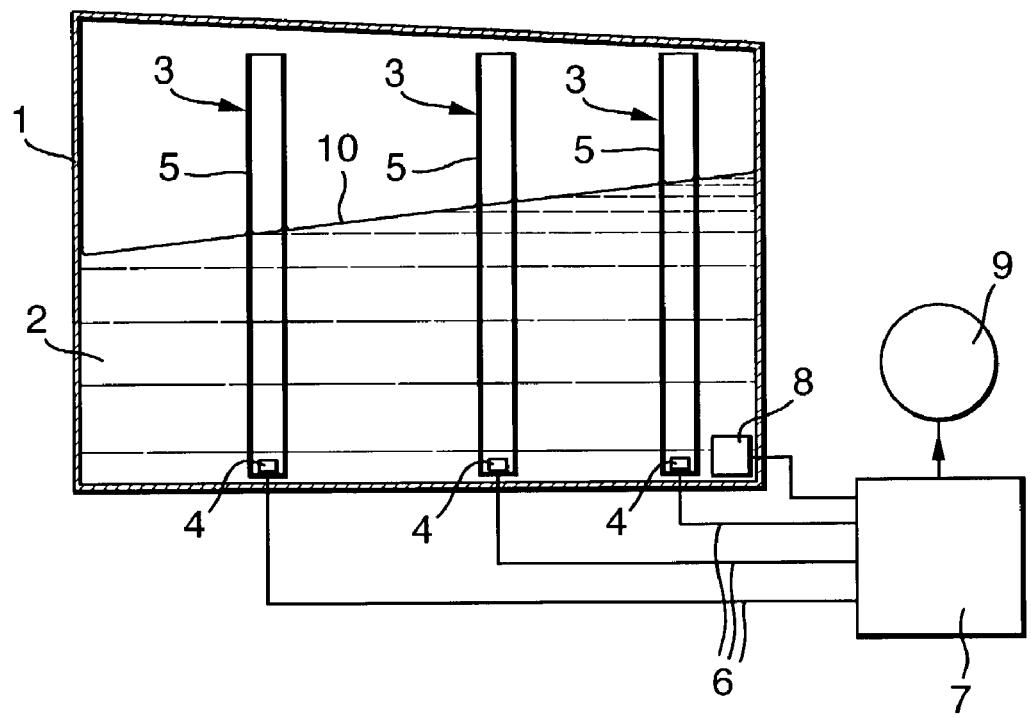
FIG. 1 illustrates the system schematically.

With reference first to FIG. 1, the system comprises a fuel tank 1 containing liquid fuel 2 and three ultrasonic gauging probes 3 mounted substantially vertically in the tank. It will be appreciated that different numbers of probes could be used.

The probes 3 may be of a conventional kind, including a piezoelectric ultrasonic transducer 4 that functions both to transmit and receive ultrasonic energy. The transducer 4 is mounted at the bottom of a cylindrical tube or stillwell 5, which is open at the bottom and top to allow fuel to flow into and out of the stillwell so that it takes up the same height as outside the probe. The transducer 4 of each probe 3 is electrically connected by a wire 6 to a processing unit 7 operating to supply signals both to and from the probes. In particular, the processing unit 7 supplies voltage pulses to the transducers 4 to cause them to propagate bursts of ultrasonic energy. The processing unit 7 receives voltage signals from the transducers 4 arising from ultrasonic energy received by the transducers and performs various calculations in order to measure the height of fuel in each probe 3, as explained in greater detail below. From the height measurements at the three probes 3 and from stored information relating to the shape of the tank 1, the processing unit 7 calculates the volume of fuel in the tank. This volume measurement is usually converted to mass using information from a densitometer 8. The processing unit 7 provides an indication of fuel quantity on a display 9 or other utilisation means.

Figure 2:
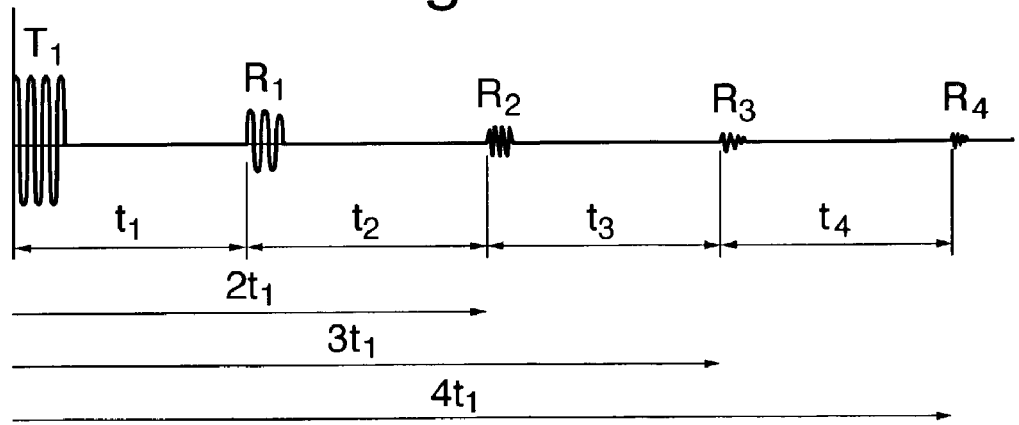
FIG. 2 illustrates signals at a probe in the system.

With reference now also to FIG. 2, there is shown the output of the transducer 4 against time along the horizontal axis. The first burst of ultrasonic energy is the transmitted pulse $T_1$ produced by a voltage applied to the transducer 4 by the processing unit 7. This burst of energy travels upwardly in the fuel 2 to the fuel surface or fuel/air interface 10 where a part of the energy is reflected back down towards the transducer 4. The energy received by the transducer 4 from this first reflection is represented by the pulse $R_1$ The magnitude of the reflected pulse $R_1$ is less than that of the transmitted pulse $T_1$ because some of the energy is absorbed by the fuel 2 and the wall of the stillwell 5, some is transmitted into the air above the fuel at the interface 10 and some is scattered away from the transducer 4. The reflected signal $R_1$ is received a time interval $t_1$ after transmission, this time being dependent on the speed of transmission of the energy in the fuel 2 and on the distance travelled, which is equal to twice the height of the fuel. A part of the reflected ultrasonic energy incident on the transducer 4 and its supporting structure at the bottom of the stillwell 5 is reflected back up to the fuel surface 10 where a part of the energy is reflected back down to the transducer to produce a second reflected signal $R_2$ having a magnitude further diminished from that of energy bursts $T_1$ and $R_1$ The second reflected signal $R_2$ is received at a time interval $t_2$ after reception of the first reflected signal $R_1$. A part of the second reflected signal is again reflected from the transducer 4 back up the stillwell 5 to produce a third reflected signal $R_3$ at a time interval $t_3$ after reception of the second reflected signal $R_2$. It will be appreciated that the number of reflected signals subsequent to the first that the system is able to identify will depend on their magnitude and noise levels. The magnitude of the reflected signals will vary according to various factors, such as the height and surface condition of the fuel.

Reception and identification of the subsequent reflected signals is used by the system to confirm the validity of the first reflected signal where the time intervals $t_2$ and $t_3$ of the subsequent reflections are equal to the time interval $t_1$ of the first reflection or are within predetermined limits of the first time interval, that is:

$$t_2, t_3 = t_1 +/- \delta t$$

This tolerance or limit $\delta t$ allows for small variations in the level of signal detection between the different reflected signals and timing resolutions.

The processing unit 7 counts the number of subsequent reflections from the fuel surface that are identified within the predetermined limits for each height measurement. The greater the number of subsequent reflections identified, the greater is the level of confidence in that height measurement. The system may utilise this information in various ways. For example, if a signal from a probe 3 is not identified with a sufficient level of confidence this signal may be ignored in the gauging and earlier or later signals from that probe used instead. Where there is disparity between the height outputs from two probes, that is, their signals are incompatible, the probe with signals at a high level of confidence may be used in preference to the other probe having signals at a lower level of confidence.

The present invention can be used to reduce the risk of a false signal, such as arising from reflection from the wall of the stillwell or other cause, being used to provide a fuel level output because such a signal will not be identified with sufficiently high confidence.

In some circumstances, the signal arising from the first reflection may not be identified. This may happen, for example, if there is electrical noise in the system. Subsequent, multiple reflections, however, may be identified. By comparison of the times of arrival of the subsequent reflections, it is possible to determine whether the reflection is the first, second, third or fourth multiple reflection and so on. For example, the time of arrival of the first and second multiple reflections is $2t_1$ and $3t_1$ respectively (see FIG. 2), where $t_1$ is the time of travel for the first, undetected, reflection. The ratio between these two times $2t_1$ and $3t_1$ is, therefore, $1.500 +/- \delta r_2$ (that is, 3/2), see FIG. 2. The ratio for the second and third multiple reflections, for example, is $1.333 +/- \delta r_3$ (that is, 4/3), see FIG. 2. This difference enables the different multiple reflections to be identified and hence enables fluid height to be calculated when the first reflection is not identified. The tolerance limits $\delta r_2$, $\delta r_3$, etc allow for small variations in the level of signal detection between the different reflected signals and timing resolutions.

Previous probes were usually designed to minimize multiple reflections from the lower end of the probe. In the present invention, the lower end of the probe may be specifically designed to optimize multiple reflections.

It will be appreciated that the present invention is not confined to gauging fuel but could be used to gauge other fluids.

I claim:

1. An acoustic fluid-gauging system comprising:
an acoustic transducer, wherein the acoustic transducer transmits acoustic signals to a fluid interface and receives acoustic signals reflected from the interface, wherein
the system measures the time interval between transmission of a signal and reception of a first reflected signal from the interface, and monitors for subsequent reflected signals from the interface arising from reflection of the first reflected signal back to the fluid interface, and wherein
the system measures the time intervals between receipt of the subsequent reflected signals and calculates the ratio of at least one of the measured time intervals to at least one other of the measured time intervals to identify the received signals and utilizes information derived from the subsequent reflected signals in determining said fluid quantity.

2. The system of claim 1, wherein the system determines whether the time interval between reception of the first reflected signal and the subsequent reflected signal is within predetermined time limits of the time interval between transmission and reception of the first reflected signal.

3. The system of claim 1, wherein the system determines a number of subsequent reflected signals detected within predetermined time limits.

4. The system of claim 1, wherein the transducer is a part of a probe including a still well, and wherein the transducer is mounted at a lower end of the still well.

5. The system of claim 4, wherein the lower end of the probe reflects acoustic energy upwardly.

6. The system of claim 1, comprising:
a plurality of transducers.

7. The system of claim 1, wherein the system assigns a level of confidence to a received signal, and wherein the level of confidence is greater the greater the number of reflections associated with that signal.

8. The system of claim 7, wherein the system selects between different incompatible signals according to the confidence level of each signal.

9. The system of claim 8, wherein the incompatible signals are signals from the same transducer at different times.

10. The system of claim 8, wherein the incompatible signals are signals from different transducers.

11. The system of claim 1, wherein the system determines ratios of times of arrival of successive reflections and uses information about the ratios to identify a number of a reflection.

12. An acoustic fluid gauging system, comprising:
an acoustic transducer, wherein the acoustic transducer transmits acoustic signals to a fluid interface and receives acoustic signals reflected from the interface; and
a processor, wherein the processor measures the time interval between transmission of a signal and reception of a first reflected signal from the interface, wherein
the processor monitors for subsequent reflected signals from the interface arising from reflection of the first reflected signal back to the fluid interface,
and wherein the processor measures the time intervals between receipt of the reflected signals and calculates the ratio of at least one of the measured time intervals to at least one other of the measured time intervals to identify the received signals and utilizes information derived from the subsequent reflected signals in determining fluid quantity.

13. A method of gauging fluid, comprising:
transmitting an acoustic signal from a first location to a fluid interface;
receiving a first reflected signal from the interface;
determining a first time interval between transmission and reception of the first reflected signal;
receiving subsequent reflected signals from the interface arising from reflection of the first reflected signal back to die fluid interface;
measuring the time intervals between reflected signals;
calculating the ratio of at least one of the measured time intervals to at least one other of the measured time intervals;
identifying the reflected signals using the ratio; and
utilizing information derived from the subsequent reflected signals in determining fluid quantity.

14. The method of claim 13, comprising:
determining a first time interval between reception of the first reflected signal and the subsequent reflected signal; and
determining whether the time interval of the subsequent reflected signal is within predetermined limits of the first time interval.

15. The method of claim 13, comprising:
determining a number of subsequent reflected signals within predetermined time limits.

16. The method of claim 13, comprising:
assigning a level of confidence to a signal, wherein
the level of confidence is greater the greater the number of reflections associated with that signal.

17. The method of claim 16, comprising:
selecting between different incompatible signals according to the confidence level of each signal.

18. The method of claim 17, wherein the incompatible signals are signals from the same transducer at different times.

19. The method of claim 17, wherein the incompatible signals are signals from different transducers.

20. The method of claim 13, comprising:
determining ratios of times of arrival of successive reflections; and
using information about the ratios to identify a number of a reflection.

21. A method of gauging the height of fuel in a tank, comprising:
transmitting ultrasonic signals from a transducer at a lower end of a plurality of probes mounted vertically in the tank so that the ultrasonic signals are reflected successively a plurality of times between a fuel-air interface and the Lower end of the probe;
receiving the transducer signals reflected back from the fluid interface;
determining times of reception of successive reflected signals from the fluid interface;
measuring the time intervals between the successive reflected signals from the fluid interface;
calculating the ratio of at least one of the measured time intervals to at least one other of the measured time intervals;
identifying the reflected signals using the ratio; and
utilizing information derived from the reflected signals in determining fuel quantity.

* * * * *